Figure 1:
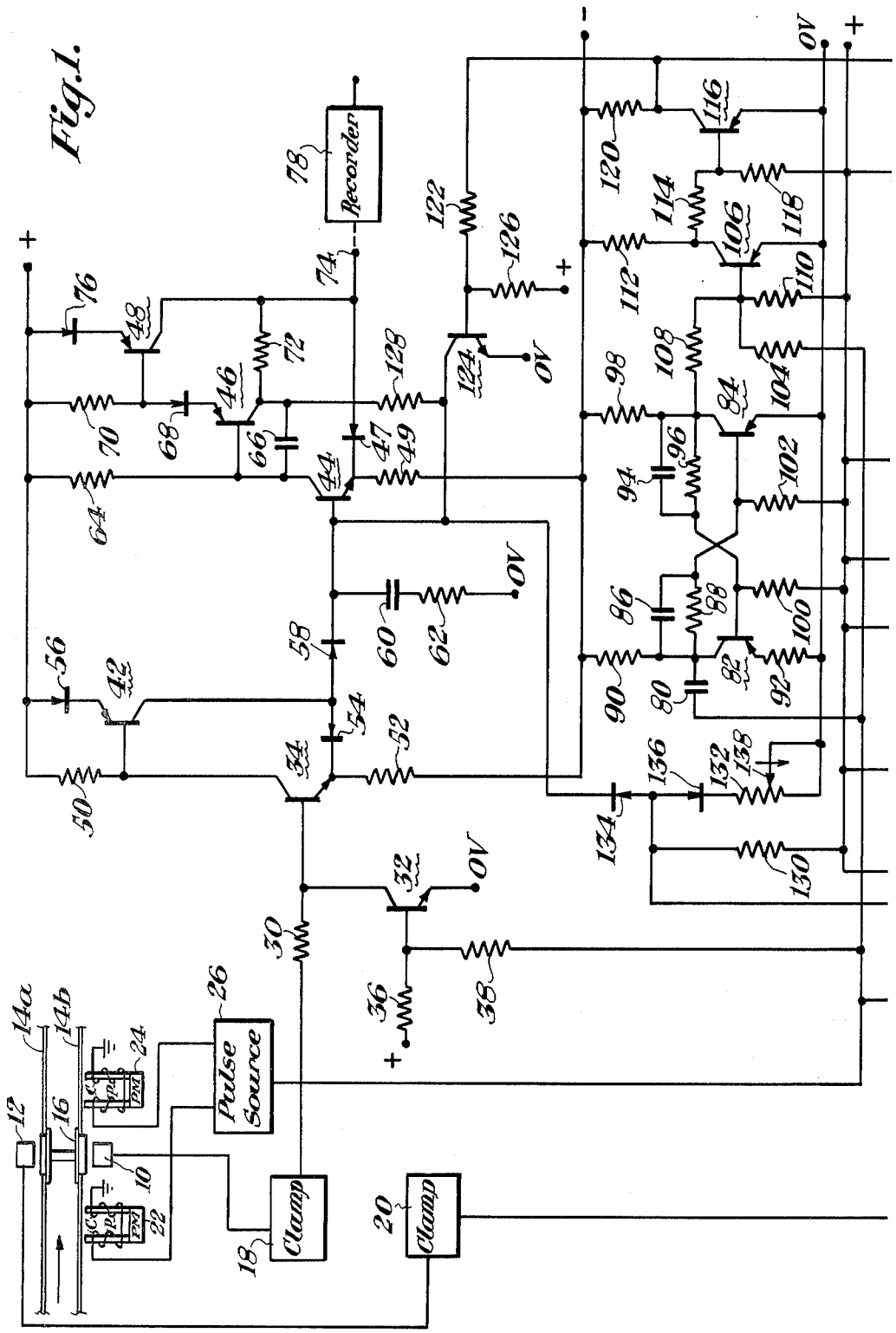

INVENTOR.
Thomas J. Blocher Jr.
BY
W. L. Stout.
HIS ATTORNEY

United States Patent Office

3,263,090
Patented July 26, 1966

3,263,090
DATA STRETCHING CIRCUIT
Thomas J. Blocher, Jr., Monroeville, Pa., assignor to Westinghouse Air Brake Company, Wilmerding, Pa., a corporation of Pennsylvania
Filed Apr. 20, 1962, Ser. No. 189,025
2 Claims. (Cl. 307—88.5)

The present invention relates to electrical circuits and, more particularly, to a data stretching circuit for stretching the width of a received signal. While the invention is of general utility, it has particular utility in hot journal bearing detector systems and will be described in that environment.

The detection of overheated journal conditions on railway vehicles is increasingly being determined through the use of various types of infra-red detectors which are mounted on the wayside and arranged to scan the area surrounding the ends of the axle. The output of these hot journal detectors is in the form of a voltage which is related to the temperature of the passing axle. In certain systems the scanner or infra-red cell unit is constantly scanning or viewing the general area at which it is aimed or to which it is exposed with the result that it continually provides a voltage output representing the temperature of whatever it happens to be aimed at. Since only the temperature of the area immediate the ends of the axles is of interest, it is necessary to gate the continuous output of the scanner so as to admit to the remainder of the detecting system only those voltages which relate to that temperature. In order to reduce the possibility of obtaining erroneous readings during the gating period as a result of interference from warm apparatus or objects which might be nearby or escaping steam, the gate actuating apparatus is so arranged that the gated output is very narrow. Since it is often desirable that a permanent record of this narrow gated output be made on a strip chart recorder, it is necessary that the recorder used have an extremely high speed of response so as to be capable of recording the narrow gated output pulse actuated by the passage of a fast moving train. However, such high speed recorders require a large initial investment, and the recording paper used therewith is far more expensive than that used with conventional ink or hot-stylus recorders. Therefore, it is desirable from an economic standpoint to provide a means for recording the narrow gated output on standard and comparatively less expensive recording equipment.

It is a principal object of the present invention to provide a means which will enable the narrow gated output of high speed hot box detector apparatus to be recorded on standard recording equipment.

The difficulty which arises as a result of using a standard strip chart recorder for recording the narrow gated output of the scanner or infra-red detector is that the pen or stylus does not have enough time to make a clear and distinct record of the peak amplitude of the gated data. Accordingly, it is another object of this invention to provide data stretching apparatus which will enable the pen or stylus of a recorder to make a clear and distinct record of the peak amplitude of the narrow gated output from the infra-red detector.

It is an additional object of the present invention to provide apparatus which will enable the recording device used to record the passage of axles regardless of their temperature condition.

In the specific embodiment of the invention, herein shown and described for the purpose of illustration, a gating arrangement is provided for admitting data from the hot journal detector system into an amplifier and storage means where the data is simultaneously stored and an output to a recording device provided. Coupled to the amplifier and data storage arrangement is a one-shot multivibrator and storage discharging cicuitry which cooperate to assure a continuous output to the recorder for a predetermined period beyond the time data is admitted by the gating means. When the predetermined output period is ended, the multivibrator in conjunction with the storage discharge means also serves to evacuate the data storage means. In the preferred embodiment of this invention, solid state impedance means such as transistors are employed in the above-referred to amplifier, multivibrator, storage means, storage discharge means, and gating means.

Figure 2:
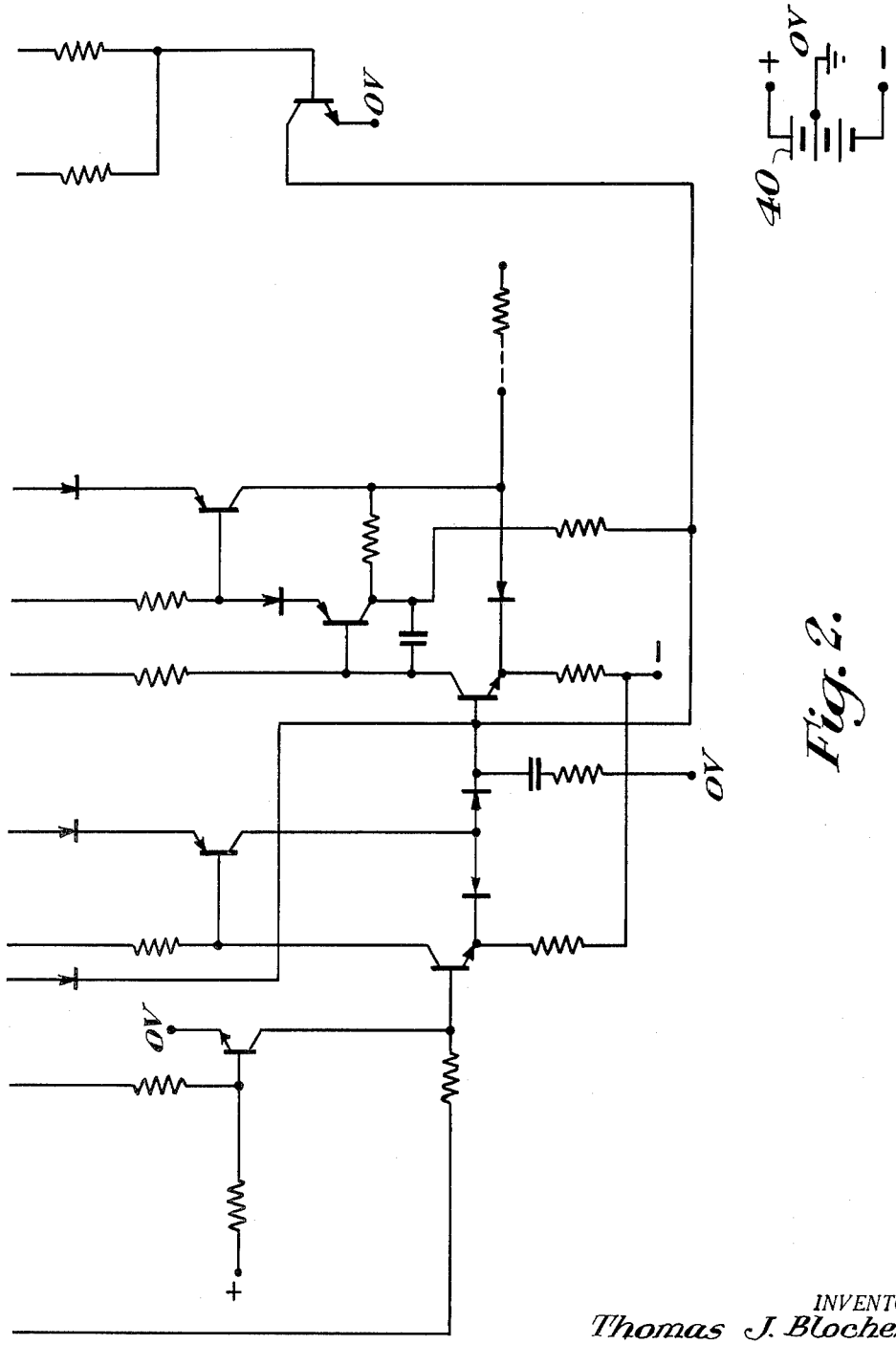

Other objects, purposes and characteristic features of my invention will become, in part, obvious from the accompanying drawings and, in part, pointed out as the description of my invention progresses and reference is made to the accompanying drawings, in which similar reference characters refer to corresponding parts throughout the several views, and in which:

FIGS. 1 and 2 are schematic diagrams which, when placed with FIG. 1 above FIG. 2, illustrate the circuitry arrangement of the data stretching system constructed in accordance with the principles of this invention.

Referring now to FIG. 1 of the drawings, a pair of radiant energy detectors 10 and 12 are shown positioned on opposite sides of track rails 14a, 14b and are oriented with respect to wheels 16 of a passing railway vehicle to concurrently check, that is, receive radiation from areas adjacent the opposite ends of the axle of wheel 16. The output of detector 10 is conductively connected to a clamping amplifier, herein referred to as a clamp 18, and the output of detector 12 is also conductively connected to a clamping amplifier or clamp 20.

Mounted alongside rail 14b on opposite sides of detector 10 are a pair of wheel inductors 22 and 24. Each wheel inductor includes a permanent magnet PM on which is mounted a pair of soft iron pole pieces P forming a U-shaped structure. Coils C are wound on each of the pole pieces P; the two coils on each inductor are connected in series, and have one terminal connected to circuit common. The free ends of the soft iron pole pieces P are mounted adjacent the track rail 14b such that a passing wheel decreases the reluctance between the ends of the pole pieces of the same inductor causing an output voltage pulse to be induced in the associated coils C. Wheel inductors 22 and 24, which are also electrically connected to a pulse source 26, are so arranged on opposite sides of detector 10 and adjacent rail 14b that when a vehicle wheel 16, traveling in the direction indicated by the arrow, passes inductor 22, a voltage is induced which causes pulse source 26 to provide a negative going output into the system and as the wheel passes inductor 24 another voltage is induced which causes pulse source 26 to provide a positive going output to the system for purposes presently disclosed. A track circuit, of any suitable known type, establishes the direction of travel of a train so that in one direction of travel inductor 22 pulses gate 26 to provide the negative going output, and inductor 24 pulses gate 26 to provide the positive going output. Conversely, when a train is traveling in the opposite direction the track circuit actuates an appropriate switching device such that inductor 24 causes the pulse source to provide the negative going output and inductor 22 causes the pulse source to provide the positive going output.

It is inductors 22 and 24 which provide a means of gating only that output from the detectors which is indicative of bearing temperature into the system. The position of the inductors on either side of the detector is arranged so that only when an axle is between the detectors will the system admit and process the output of the detectors. Since the detectors are positioned directly opposite one another, only one pair of inductors for gating their output is necessary.

The pulse source 26 employed in this system may be in the form of a conventional flip-flop construction shown in any standard text, as, for example, in Pulse and Digital Circuits by Millman and Taub, published by McGraw-Hill Book Co., 1956. In accordance with the operating requirements of this system, the pulse source or flip-flop is arranged to be set and reset by the wheel locaters to provide a positive going or negative going output depending upon the direction of travel of the rail vehicle.

The outputs of detectors 10 and 12 are coupled to clamping amplifiers 18 and 20. Each clamp is designed and arranged so that when the axle of a passing vehicle is adjacent its respective detector, it clamps onto the coldest axle on its side of the vehicle so as to establish an ambient temperature or reference basis. When an axle is viewed which is warmer than the one used to establish the reference basis, the associated clamp will provide a positive output voltage, the magnitude of which is in proportion to the temperature of the axle. When an axle on a subsequent vehicle is colder than any of the axles previously scanned, the clamp 20 will establish a new reference basis by clamping onto the colder axle. Thus the reference basis can be lowered by the detector viewing a colder axle. While it would be desirable to have a fixed reference basis, a change of reference in this manner is not detrimental to the operation of the system inasmuch as any lowering of the reference basis would be insignificant compared to the signal transmitted due to a hot bearing. The output of the clamp would be positive with respect to the zero reference of the system.

The output from detector 10 is fed into clamp 18 the output of which is fed into the circuitry shown in FIG. 1 and the output from detector 12 is fed into clamp 20 and through the circuitry shown in FIG. 2. Since the circuitry arrangements into which the outputs of clamps 18 and 20 are fed are similar in structure and operation, a discussion of only one of the circuits is deemed sufficient to an understanding of this invention. Accordingly, a discussion of the structural arrangement and operation of this invention will be given with respect to the circuits shown in FIG. 1 of the drawings.

The positive output voltage from clamp 18 to the circuitry of this invention is fed through resistor 30 which is connected at one end to the output of clamp 18 and at its other end to the junction between the collector of transistor 32 and the base of transistor 34. The base of transistor 32 is connected to a positive potential through resistor 36 and to pulse source 26 through resistor 38, while its emitter is connected to zero or ground potential. Transistor 32, which is of the N-P-N type, is arranged to gate certain portions of the output from the clamp into the circuitry of this invention in a manner presently described.

The various biasing voltages to the transistors shown in FIGS. 1 and 2 of the drawings are obtained from a suitable source of energy indicated as a battery 40, shown in the drawings beneath FIG. 2, which has a center tap connected to zero or ground potential.

As previously mentioned resistor 30 is coupled to the base of transistor 34. Transistor 34, in conjunction with transistors 42, 44, 46 and 48, is arranged to form a two-stage amplifier, with transistors 34 and 42 forming the first amplifier stage and transistors 44, 46 and 48 forming the second amplifier stage. Transistors 34 and 44 are of the N-P-N type, while transistors 42, 46 and 48 are of the P-N-P type.

The collector of transistor 34 is coupled to the base of transistor 42 and to the positive terminal of the voltage supply through collector load resistor 50, while the emitter is connected to the negative terminal of the voltage supply through resistor 52 and to the cathode of a temperature compensating diode 54. The second transistor 42 in the first stage of the amplifier has its emitter connected to the positive terminal of the voltage supply through a bias stabilization diode 56, while its collector is connected to the anodes of diodes 54 and 58. The cathode of diode 58 is connected to the base of transistor 44 and also through capacitor 60 and resistor 62 to zero or ground potential. The collector of transistor 44 is coupled to the positive terminal of the voltage supply through collector load resistor 64 and to the base of transistor 46. The collector of transistor 44 is also coupled to the collector of transistor 46 through capacitor 66. The emitter of transistor 44 is connected to the collector of transistor 48 through diode 47 and also to the negative terminal of source 40 through resistor 49. The emitter of transistor 46 is coupled through diode 68 and resistor 70 to the positive terminal of the voltage supply and to the base of transistor 48 which is connected to the junction between diode 68 and resistor 70. The collector of transistor 46 is connected through resistor 72 to the collector of transistor 48 and an output terminal 74. The emitter of transistor 48 is connected to the positive terminal of the voltage supply through diode 76.

The foregoing two-stage amplifier is arranged so that the output of the first stage, which consists of transistors 34 and 42, is used to charge capacitor 60 to the peak voltage which is admitted through resistor 30, and which represents the temperature of the area adjacent the axle end scanned by detector 10. The second amplifier stage which consists of transistors 44, 46 and 48 provides a current gain for an output which may be taken across terminal 74 and zero or ground potential. A record may be made for subsequent visual examination by connecting a recording device 78, such as a strip chart recorder, to this output terminal 74.

Transistor 32, which has its base connected through resistance 38 to pulse source 26 and its collector connected to the output end of resistor 30, is controlled by pulse source 26 to admit only those portions of the output from clamp 18 to the base of transistor 34 which relate to the temperature of the axle of wheels 16.

The circuitry described thus far is used to admit, amplify, store and provide an output which is representative of the temperature of the area adjacent the axle of the passing wheel. The circuitry which will be described now is used to stretch the output through terminal 74 to the recorder 78 for a predetermined period after the axle has passed detectors 10 and 12.

Pulse source 26 which is connected to and controls the gating operation of transistor 32 is also connected through input capacitor 80 to a one-shot multivibrator which is formed by a pair of P-N-P transistors 82 and 84. The collector of transistor 82 is connected to the input terminal of capacitor 80 and in addition is coupled to the base of transistor 84 through cross-coupling capacitor 86 and cross-coupling resistor 88. The collector of transistor 82 is also connected to a negative potential through a collector load resistor 90, while its emitter is connected to zero or ground potential through resistor 92. The collector of transistor 84 is coupled to the base of transistor 82 through cross-coupling capacitor 94 and cross-coupling resistor 96. In addition, a collector load resistor 98 couples the source of negative potential to the collector of transistor 84. The emitter of transistor 84 is connected to zero or ground potential. A reverse biasing potential is supplied to transistors 82 and 84 by connecting the base of transistor 82 through resistor 100 to the positive source of potential and by connecting the base of transistor 84 through resistor 102 to the same source of positive potential. When the one-shot multivibrator just described is in its one stable state, transistor 82 is cut off and transistor 84 is conducting.

The output of pulse source 26 is also coupled through a resistor 104 as an input to a NOR circuit which is formed around a P-N-P type transistor 106 by resistors 104, 108, 110 and 112. In addition to being coupled to pulse source 26 the base of transistor 106 is also coupled to the output of the multivibrator by means of resistor 108 which is connected to the collector of transistor 84. A reverse bias is supplied to transistor 106 by connecting a positive source of potential through resistor 110 to its base. The collector of transistor 106 is coupled to a negative source of potential through a collector load resistor 112 and is also coupled through resistor 114 to an inverter which is formed around a P-N-P type transistor 116 by resistors 114, 118 and 120. The emitter of transistor 106 is connected to zero or ground potential. The base of transistor 116 is reverse-biased through resistor 118 to the positive source of potential, while its emitter is connected to zero potential. The collector of transistor 116 is connected to a source of negative potential through collector load resistor 120 and is also connected through resistor 122 to the base of an N-P-N type transistor 124. A forward bias is applied to the base of transistor 124 by connecting resistor 126 between the base and a positive source of potential and an emitter bias is applied by connecting the emitter to zero or ground potential. The collector of transistor 124 is connected to the junction between the base of transistor 44 and capacitor 60 and is also connected to the collector of transistor 46 through resistor 128.

The circuitry described thus far is capable of receiving and storing the data provided by clamp 18 and of providing an output to the recording mechanism for a period including and extending beyond the duration of the gated data, which extension is determined by the unstable cycle time of the one-shot multivibrator. When the multivibrator returns to its stable state, the stored data is then evacuated through the gate provided by transistor 124 in a manner presently described. In the event the level of the signal from detector 10 through clamp 18 is very low, due to a low temperature condition of the axle, a circuit arrangement is provided which will provide an artificial or pedestal voltage to indicate the passage of an axle by the recording mechanism 78. This is accomplished by providing a voltage divider network in the form of resistor 130 and potentiometer 132 between the positive source of potential and ground which is arranged to supply a minimum voltage to charge capacitor 60 through diode 134. As shown in the schematic drawing the cathode of diode 134 is connected to the junction between capacitor 60, and the collector of transistor 124, while the anode is connected through resistor 130 to a positive source of potential and to the anode of a diode 136 through potentiometer 132 to zero or gorund potential. An appropriate pedestal voltage is selected by adjusting variable contact 138 of potentiometer 132.

In considering the operation of the overall circuitry it is to be understood that detectors 10 and 12 are constantly scanning and providing an output representing the temperature of the objects or area to which the detectors are exposed. The continuous output provided by detectors 10 and 12 is fed into clamps 18 and 20, respectively. As previously mentioned, since the circuitry connected to the output of clamp 20 is identical in structure and operation to the circuitry connected to clamp 18, only the operation of the circuitry connected with clamp 18 and shown in FIG. 1 will be discussed.

The function of clamp 18 is to receive the output of detector 10 and provide a positive output voltage to resistor 30 which is representative of the temperature of the environment scanned by detector 10. Since the input to resistor 30 from clamp 18 is continuous and since only that portion of the input which is indicative of the axle temperature is to interest, the remainder of the input is by-passed or gated through the collector and emitter of conducting transistor 32 to ground. The conducting condition of transistor 32 is maintained by applying a positive potential from source 40 through resistor 36 to the base of the transistor. However, when a wheel 16 of a train traveling in the direction indicated by the arrow passes adjacent inductor 22, a voltage is induced which causes pulse source 26 to provide a negative going voltage output through resistor 38 to the base of transistor 32 which is sufficient to override the positive potential through resistor 36, thereby cutting off transistor 32. With transistor 32 turned off, and thus in effect taken out of the circuit, transistor 34 is now permitted to follow the voltage impressed on its base through resistor 30 and which represents the temperature of the area adjacent the end of the axle scanned by detector 10. Since a more positive voltage is impressed on the base of transistor 34, the current flow through its collector circuit is increased which in turn causes a corresponding increase in the current flow through the collector circuit of transistor 42 so as to charge capacitor 60 through diode 58 to the same voltage level as the input. Thus the purpose of the first stage of the amplifier is to develop enough current to charge capacitor 60. The second stage of the amplifier, which consists of transistors 44, 46 and 48, is designed to provide a much higher gain than the first stage so as to maintain the output at the same level as the voltage stored in capacitor 60 and also so as to drain the capacitor as little as possible to achive this effect. The positive voltage stored in capacitor 60 is also impressed on the base of transistor 44, thereby increasing the current flow in its collector circuit which in turn results in an increase in current flow in the collector circuits of transistors 46 and 48. The output of the second stage of the amplifier may be taken from the collector circuit of transistor 48 which is represented by terminal 74, and fed into recorder 78.

As previously mentioned, when wheel 16, traveling in the direction indicated, passed inductor 22, pulse source 26 provided a negative output which served to cut off transistor 32 and admit the positive voltage output from clamp 18 to the base of transistor 34. The output of pulse source 26 is also coupled to the multivibrator through input capacitor 80 and to the NOR circuit through resistor 104. During the time that pulse source 26 is providing a negative output, the multivibrator is so arranged that it is in its stable state with transistor 84 conducting and transistor 82 cut off. Accordingly, the negative output from gate 26 through capacitor 80 has no effect on the stable state of the multivibrator. However, the negative output from pulse source 26 through resistor 104 to the base of transistor 106 does cause transistor 106 to conduct, thereby cutting off the conduction of transistor 116 which in turn cuts off transistor 124. With transistor 124 cut off the discharge path of capacitor 60 through its collector and emitter to ground is also cut off. As a result, capacitor 60 remains in its charged state, thereby providing a continuous output through terminal 74 to the recorder 78.

When wheel 16, still traveling in the direction shown, passes inductor 24, pulse source 26 is actuated to provide a positive going instead of a negative going output, the effect of which causes transistor 32 to commence conducting again, thereby making resistor 30 the collector load resistor of transistor 32 which in turn effectively cuts off an input to the first stage of the amplifier through the base of transistor 34. As the positive going output from pulse source 26 is serving to turn transistor 32 on, it is also fed through capacitor 80 to set the multivibrator in its unstable state so that transistor 82 becomes conducting and transistor 84 becomes nonconducting. Of course, when the output of pulse source 26 changed from a negative going condition to a positive going condition, the negative going potential which was applied through resistor 104 to the base of conducting transistor 106 was removed. However, simultaneously with the removal of this negative going potential from the base of transistor 106 is the application of another negative potential through resistor 108 to its base which serves to maintain transistor 106 in a state of conduction. This negative going potential through resistor 108 is applied as a direct result of the unstable state into which the multivibrator was triggered by the application of a positive going pulse from pulse source 26 through input capacitor 80. Since the conduction of transistor 106 is maintained, the non-conducting conditions of transistors 116 and 124 remain the same thereby preventing the discharge of capacitor 60. As a result, the output through terminal 74 of the second stage of the amplifier is maintained notwithstanding the fact that the axle of wheel 16 has passed by and thus is no longer being scanned by detector 10. The time during which this output from the second stage of the amplifier through terminal 74 will continue is determined by the duration of the unstable state of the multivibrator. As previously indicated, the unstable state time of the multivibrator should be sufficient to allow the pen or stylus of the recorder 78 to make a legible dark mark which will represent the peak amplitude of the voltage output from clamp 18 and yet be of short enough duration so as to allow the multivibrator to return to its stable state in time for the system to receive the temperature condition of the axle of the following wheel.

When the multivibrator returns to its stable state the negative potential through resistor 108 is removed and transistor 106 cuts off, thereby causing transistor 116 and then gating transistor 124 to commence conducting. With transistor 124 now conducting a path is provided through its collector circuit which enables capacitor 60 to discharge very rapidly.

In order to visually pin-point the location of an overheated axle condition as disclosed by the hot journal detecting system, it is essential that the pen or stylus of the recorder be reflected sufficiently by the passage of each axle. However, since the temperature of most axles is below a level of concern, it is necessary to insert a minimum voltage which, in the absence of a stronger signal from detector 10, will charge capacitor 60 sufficiently to provide an output through terminal 74 so as to cause the recorder pen or stylus to deflect, thereby assuring a record of the passage of each axle even though its temperature is below a level of concern. In order to achieve this, a minimum voltage is dropped across the voltage divider formed by resistors 130 and 132 which is inserted through diode 134 to capacitor 60 so that then pulse source 26 is actuated, capacitor 60 will be charged even though the input voltage on the base of transistor 34 is zero. In the event the axle condition is such as to cause a voltage output through detector 10 and clamp 18 which is greater than the minimum or artificial voltage inserted through diode 134, then diode 134 will become reverse-biased and the voltage through the first stage of the amplifier will charge capacitor 60 through diode 58, thereby preventing the voltage divider network from interfering with the legitimate signal if one exists.

Although the present invention has provided a circuitry arrangement for extending the time in which the recorder in a hot box detecting system has to respond, it is to be understood that this form is selected to facilitate the disclosure of the invention and is not intended to limit the number of forms which it may assume or the number of applications in which it may be employed. Moreover, it is to be further understood that various modifications, adaptations and alterations may be applied to the specific circuitry shown to meet the requirements of practice, without in any manner departing from the spirit or scope of the present invention.

Having thus described my invention, what I claim is:

1. A circuit for stretching a signal from a source for a predetermined period beyond the duration of said signal comprising, an amplifier having a first and second stage with input and output terminals to each stage, a pulse source for providing a pulse having a leading edge and a trailing edge, a first gate actuated a leading edge edge of said pulse for admitting said signal into said first amplifier stage, storage means for receiving and storing said signal and for applying said signal to said second stage to provide a continuous output representative of the amplitude of said signal, a second gate connected to a junction between the output terminal of said first amplifier stage and the input terminal of said second amplifier stage, said storage means consisting of a capacitor having one of its terminals connected to said junction and its other terminal connected through an impedance element to a source of potential, and means responsive to the trailing edge of said pulse for controlling said second gate to discharge said capacitor at the end of said predetermined period.

2. A circuit for stretching the time duration of a given portion of a continuous signal for a predetermined period comprising, an amplifier having first and second stages, means for selecting said given portion of said continuous signal, means actuated by said selecting means for generating a pulse having a leading edge and a trailing edge, first gating means responsive to said pulse for admitting only said given portion of said continuous signal to said first amplifier stage, storage means for receiving said given portion of said signal from said first amplifier stage and for applying said signal to said second amplifier stage to provide a continuous output from said second amplifier stage, second gating means for evacuating said storage means, a multivibrator having a normally stable state and an unstable state of a predetermined duration, control means responsive to the leading edge of said pulse for closing said second gating means to retain the given portion of said signal in said storage means and responsive to the trailing edge of said pulse for opening said second gating means and evacuating said signal from said storage means, said multivibrator responsive to the trailing edge of said pulse for establishing its unstable state to provide an output for overriding the effect of the trailing edge of said pulse on said control means whereby said second gating means is retained in its closed position for the duration of the unstable state of said multivibrator.

References Cited by the Examiner

UNITED STATES PATENTS

| | | | |
|---|---|---|---|
| 2,572,080 | 10/1951 | Wallace | 328—58 |
| 2,653,237 | 9/1953 | Johnstone et al. | 328—58 |
| 2,767,311 | 10/1956 | Meyer | 328—58 |
| 2,881,255 | 4/1959 | Hall | 328—58 X |
| 2,899,554 | 8/1959 | Rosen | 328—58 |
| 2,914,750 | 11/1959 | Cook | 340—173 |
| 2,963,575 | 12/1960 | Pelino et al. | 246—169 |
| 2,999,152 | 9/1961 | Gallagher et al. | 246—169 |
| 3,108,773 | 10/1963 | Pelmo | 246—169 |
| 3,177,359 | 4/1965 | Bramer et al. | 246—169 |

OTHER REFERENCES

Railway Signalling and Communications (R.S.C.), October 1959, published by Simmons-Boardman, N.Y., pages 26–29.

ARTHUR L. LA POINT, *Primary Examiner.*

LEO QUACKENBUSH, *Examiner.*

S. B. GREEN, *Assistant Examiner.*